United States Patent
Edwards

(10) Patent No.: US 7,499,959 B2
(45) Date of Patent: Mar. 3, 2009

(54) SYSTEM AND METHOD FOR PERFORMING AN ON-LINE CHECK OF A FILE SYSTEM

(75) Inventor: John K. Edwards, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 377 days.

(21) Appl. No.: 11/024,184

(22) Filed: Dec. 28, 2004

(65) Prior Publication Data

US 2005/0114297 A1    May 26, 2005

Related U.S. Application Data

(63) Continuation of application No. 10/105,022, filed on Mar. 22, 2002, now Pat. No. 6,895,413.

(51) Int. Cl.
*G06F 12/00* (2006.01)
*G06F 17/30* (2006.01)

(52) U.S. Cl. ............... 707/204; 707/10; 707/100; 707/205; 711/141; 711/147; 711/154; 709/213; 709/219

(58) Field of Classification Search ............ 707/10, 707/200–204; 709/213, 219; 711/147, 154, 711/100, 141
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,765,151 A * | 6/1998 | Senator | 707/8 |
| 5,802,366 A | 9/1998 | Row et al. | |
| 5,809,245 A | 9/1998 | Zenda | |
| 5,870,757 A * | 2/1999 | Fuller | 707/201 |
| 5,873,118 A * | 2/1999 | Letwin | 711/156 |
| 5,875,444 A * | 2/1999 | Hughes | 707/2 |
| 5,907,672 A * | 5/1999 | Matze et al. | 714/8 |
| 5,931,918 A | 8/1999 | Row et al. | |
| 5,941,972 A | 8/1999 | Hoese et al. | |
| 5,987,506 A * | 11/1999 | Carter et al. | 709/213 |
| 6,021,414 A * | 2/2000 | Fuller | 707/202 |
| 6,038,570 A * | 3/2000 | Hitz et al. | 707/204 |
| 6,065,037 A | 5/2000 | Hitz et al. | |
| 6,070,254 A * | 5/2000 | Pratt et al. | 714/43 |
| 6,138,126 A * | 10/2000 | Hitz et al. | 707/202 |

(Continued)

OTHER PUBLICATIONS

"Fast Consistency Checking for Solaris File System"—Peacock et al.—Sun Microsystems Computer Company—USEUNIX, New Orleans, Lousiianna, Jun. 1998.*

(Continued)

*Primary Examiner*—John E Breene
*Assistant Examiner*—Anh Ly
(74) *Attorney, Agent, or Firm*—Cesari and McKenna, LLP

(57) ABSTRACT

A system and method for performing an on-line check of a file system modifies various function calls within a file system layer of a storage operating system so that each time the particular inode is retrieved using the modified function calls, a check is performed on the inode and associated buffer trees before returning the requested inode to the calling process.

27 Claims, 10 Drawing Sheets

U.S. PATENT DOCUMENTS

| | | | |
|---|---|---|---|
| 6,145,094 A | 11/2000 | Shirriff et al. | |
| 6,192,408 B1* | 2/2001 | Vahalia et al. | 709/229 |
| 6,425,035 B2 | 7/2002 | Hoese et al. | |
| 6,499,039 B1* | 12/2002 | Venkatesh et al. | 707/204 |
| 6,530,038 B1* | 3/2003 | Hughes et al. | 714/15 |
| 6,560,702 B1* | 5/2003 | Gharda et al. | 713/2 |
| 6,564,228 B1* | 5/2003 | O'Connor | 707/200 |
| 6,564,318 B1* | 5/2003 | Gharda et al. | 713/2 |
| 6,584,582 B1* | 6/2003 | O'Connor | 714/21 |
| 6,643,750 B2* | 11/2003 | Achiwa et al. | 711/162 |
| 6,647,400 B1* | 11/2003 | Moran | 707/205 |
| 6,684,229 B1* | 1/2004 | Luong et al. | 707/204 |
| 6,725,392 B1* | 4/2004 | Frey et al. | 714/6 |
| 6,732,124 B1* | 5/2004 | Koseki et al. | 707/202 |
| 6,751,637 B1* | 6/2004 | Hitz et al. | 707/202 |
| 6,816,891 B1* | 11/2004 | Vahalia et al. | 709/214 |
| 6,850,955 B2* | 2/2005 | Sonoda et al. | 707/200 |
| 6,895,413 B2* | 5/2005 | Edwards | 707/201 |
| 6,934,722 B1* | 8/2005 | Goshey et al. | 707/204 |
| 7,076,509 B1* | 7/2006 | Chen et al. | 707/202 |
| 7,269,696 B2* | 9/2007 | Muhlestein et al. | 711/147 |
| 2002/0083120 A1* | 6/2002 | Soltis | 709/200 |
| 2002/0091670 A1* | 7/2002 | Hitz et al. | 707/1 |
| 2002/0169998 A1* | 11/2002 | Largman et al. | 714/25 |
| 2002/0178176 A1* | 11/2002 | Sekiguchi et al. | 707/200 |
| 2003/0028514 A1* | 2/2003 | Lord et al. | 707/1 |
| 2003/0069902 A1* | 4/2003 | Narang et al. | 707/203 |
| 2003/0078946 A1* | 4/2003 | Costello et al. | 707/201 |
| 2003/0105767 A1* | 6/2003 | Sonoda et al. | 707/100 |
| 2003/0182312 A1* | 9/2003 | Chen et al. | 707/200 |
| 2003/0182313 A1* | 9/2003 | Federwisch et al. | 707/200 |
| 2003/0182398 A1* | 9/2003 | Morlang et al. | 709/219 |
| 2003/0191810 A1* | 10/2003 | Muhlestein et al. | 709/215 |
| 2003/0195942 A1* | 10/2003 | Muhlestein et al. | 709/215 |
| 2004/0260673 A1* | 12/2004 | Hitz et al. | 707/1 |
| 2005/0038803 A1* | 2/2005 | Edwards | 707/100 |
| 2005/0187983 A1* | 8/2005 | Narang et al. | 707/200 |
| 2006/0089953 A1* | 4/2006 | Chen et al. | 707/202 |
| 2007/0094354 A1* | 4/2007 | Soltis | 709/218 |

OTHER PUBLICATIONS

File System Design for an NFS File Server Appliance—Hitz et al.—Network Appliance—USENIX Winter 1994—San Francisco, California (Technical Report 3002).*

"A File System for Continuous Media"—David P. Anderson, Yoshitomo Osawa and Ramesh Govindan—ACM Transaction on Computer Systems (TOCS), vol. 10, No. 4 Nov. 1992 (pp. 311-337).*

Uresh Vahalia, Unix Internals: The Frontier, Chapter 9, "File System Implementations"—Prentice-Hall, Inc., Upper-Saddler River, New Jersey, 1996 (pp. 261-289).*

U.S. Appl. No. 60/296,046, filed Jun. 5, 2001, Costello, et al., U.S. Provisional Application titled "Clustered Filesystem".

Virtual Interface Architecture Specification, Version 1.0, published by a collaboration between Compaq Computer Corp., Intel Corp., and Microsoft Corp., Dec. 16, 1997.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

* cited by examiner

SYSTEM AND METHOD FOR PERFORMING AN ON-LINE CHECK OF A FILE SYSTEM

CROSS REFERENCE TO RELATED APPLICATIONS

This application is a continuation of commonly assigned U.S. patent application Ser. No. 10/105,022, which was filed on Mar. 22, 2002, now U.S. Pat. No. 6,895,413 by John K. Edwards, entitled, "SYSTEM AND METHOD FOR PERFORMING AN ON-LINE CHECK OF A FILE SYSTEM," the contents of which are hereby incorporated by reference.

FIELD OF THE INVENTION

The present invention relates to file systems and, more particularly to verification of file systems.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored. A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages (in the form of packets) to the filer over the network.

A common type of file system is a "write in-place" file system, an example of which is the conventional Berkeley fast file system. By "file system" it is meant generally a structuring of data and metadata on a storage device, such as disks, which permits reading/writing of data on those disks. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ software, residing on the filer, that processes file-service requests from network-attached clients.

As used herein, the term "storage operating system" generally refers to the computer-executable code operable on a computer that manages data access and may, in the case of a filer, implement file system semantics, such as the Data ONTAP™ storage operating system, implemented as a microkernel, and available from Network Appliance, Inc. of Sunnyvale, Calif., which implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

An illustrative block diagram of an inode-based file system 100 is shown in FIG. 1. A file system information block 105 includes various metadata describing the file system. Linked to the file system information block 105 is a root inode 110 of the file system. The root inode 110 contains pointers inode file indirect blocks 115. These inode file indirect blocks 115 contain pointers to inode file direct blocks 120. Inode file direct blocks 120 point to inodes 122, which, in turn, contain pointers to indirect inodes 124. The indirect inodes 124 contain pointers to file data blocks 125(A-C). In the example of a WAFL-based file system, file data blocks 125(A-C) store 4 kilobytes (KB) of data.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. As described herein, a volume typically comprises at least one data disk and one associated parity disk (or possibly data/parity) partitions in a single disk) arranged according to a RAID 4, or equivalent high-reliability, implementation.

Known storage operating systems typically contain a program to check and repair an associated file system. Examples of such file system checking programs include the UNIX-based fsck program and the checkdisk command on Microsoft Windows®-based systems. These known file system checking programs typically execute while the file system being verified is offline. By "offline" it is meant that the file system is not available for data access by users of the file system.

An example of a known file system verification program is the WAFL Check program available from Network Appliance, Inc. of Sunnyvale, Calif. The WAFL Check program executes on file servers running Network Appliance's Data ONTAP storage operating system and checks and repairs file systems using the WAFL file system.

The WAFL Check program operates in two phases: an inode phase and a directory phase. In the inode phase, the file system verification program looks at each buffer tree associated with an inode. A "buffer tree" is a linked list of indirect and direct inode blocks which, in turn, point to file data blocks on the disks that comprise the file system. The WAFL Check program moves down each buffer tree and verifies that all pointers are valid and that no cross links occur. By "cross link" it is meant that an inode or file data block has multiple pointers to it.

In the directory phase, the WAFL Check program verifies the directory structure stored within the file system. In the example of the WAFL Check program, the checking process first goes through all of the file inodes of the file system and then through all of the directories of the file system. After making these two passes through the file system, and correcting any noted errors in the file system, the checking program completes.

In known examples, file system verification programs are executed when a user believes that there is a problem with the file system. For example, a crash or other file system failure may have occurred. A noted disadvantage of known file system checking programs is the substantial amount of time required to perform the file system check. As the file system is off-line and unavailable for data access by users, this checking time results in a prolonged period in which the data stored in a file system is unavailable to users.

SUMMARY OF THE INVENTION

This invention overcomes the disadvantages of the prior art by providing a system and method for performing on-line checking a file system in which inodes and directories comprising the file system are checked when first accessed. In the illustrative embodiment, the function calls in a storage operating system that load inodes (LoadInode( )) and buffer trees (LoadBuffer( )) are modified so that before an inode or buffer tree is returned to the process that called the loading function, a check is performed of the inode and related buffer trees. This checking procedure also repairs predetermined problems with file system coherency and consistency to ensure that the file system is stable and usable.

When a process executing within the storage operating system calls either LoadInode( ) or LoadBuffer( ), the modified function suspends the return of the requested object until a check is performed. The checking procedure then loads the requested inode or buffer tree and determines if it associated with a regular file or a directory. If the requested inode is a regular file inode, then the checking procedure checks the associated buffer trees of the inode. This procedure ensures that all buffer trees have valid pointers, that any given block does not have multiple points to it, and other file system coherency checks. The checking procedure corrects any noted errors in the file system. If the selected inode is a directory inode, then the checking procedure performs a directory check is of the selected inode. The directory checking procedure traverses the directory tree from the selected directory upwards to the root directory. Certain special cases of directories are not linked to the root directory. If a directory is not a special case and does not link to the root directory, then the directory is linked to a lost and found directory for later processing.

In the illustrative embodiment, a background process is created that sequentially loads inodes. This background process ensures that all inodes of the file system will be checked, even if another process or application does not request a particular inode.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

A. Network Environment

Figure 1:
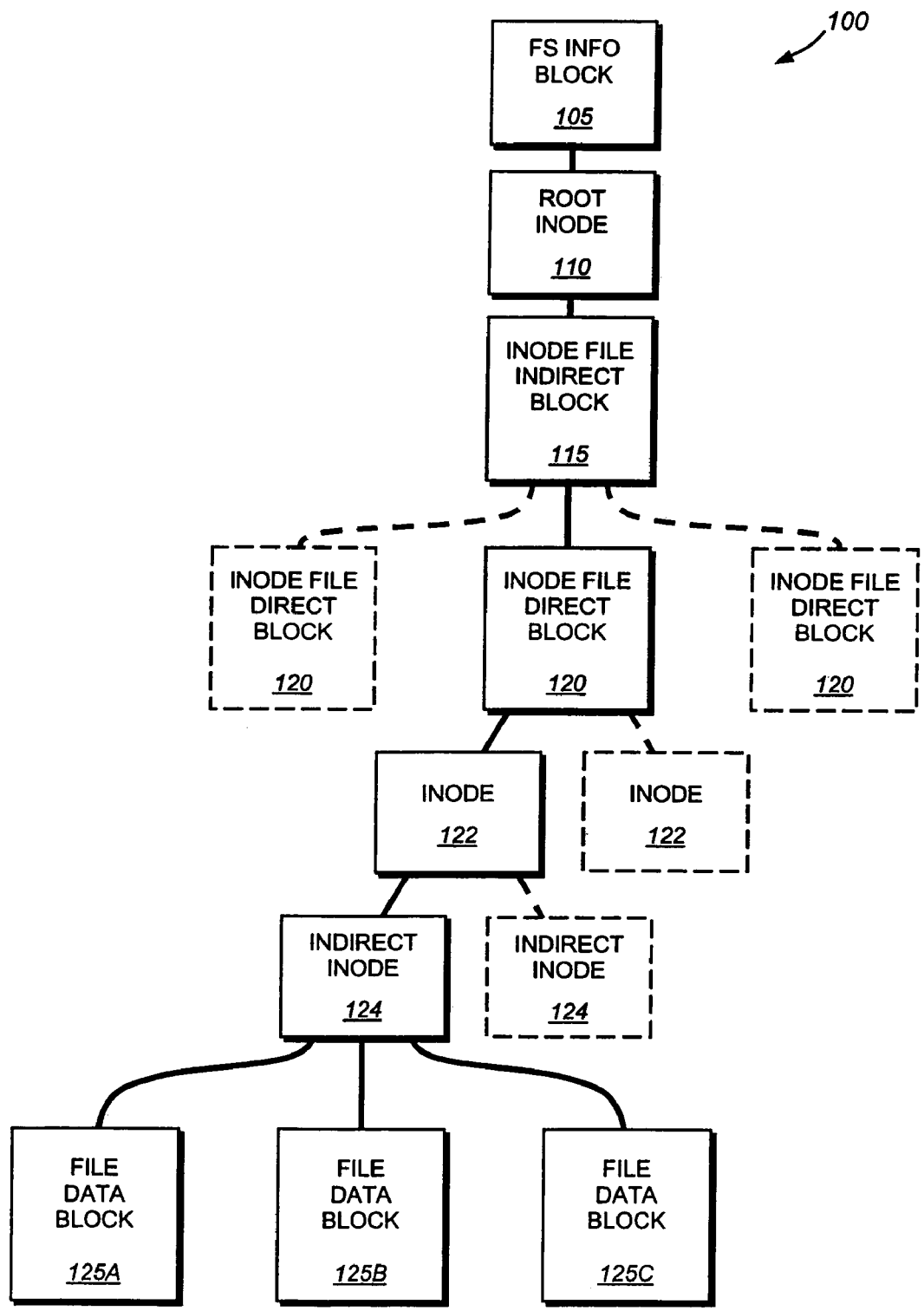
FIG. 1 is a schematic block diagram of an exemplary file system data structure including buffer trees.
Figure 2:
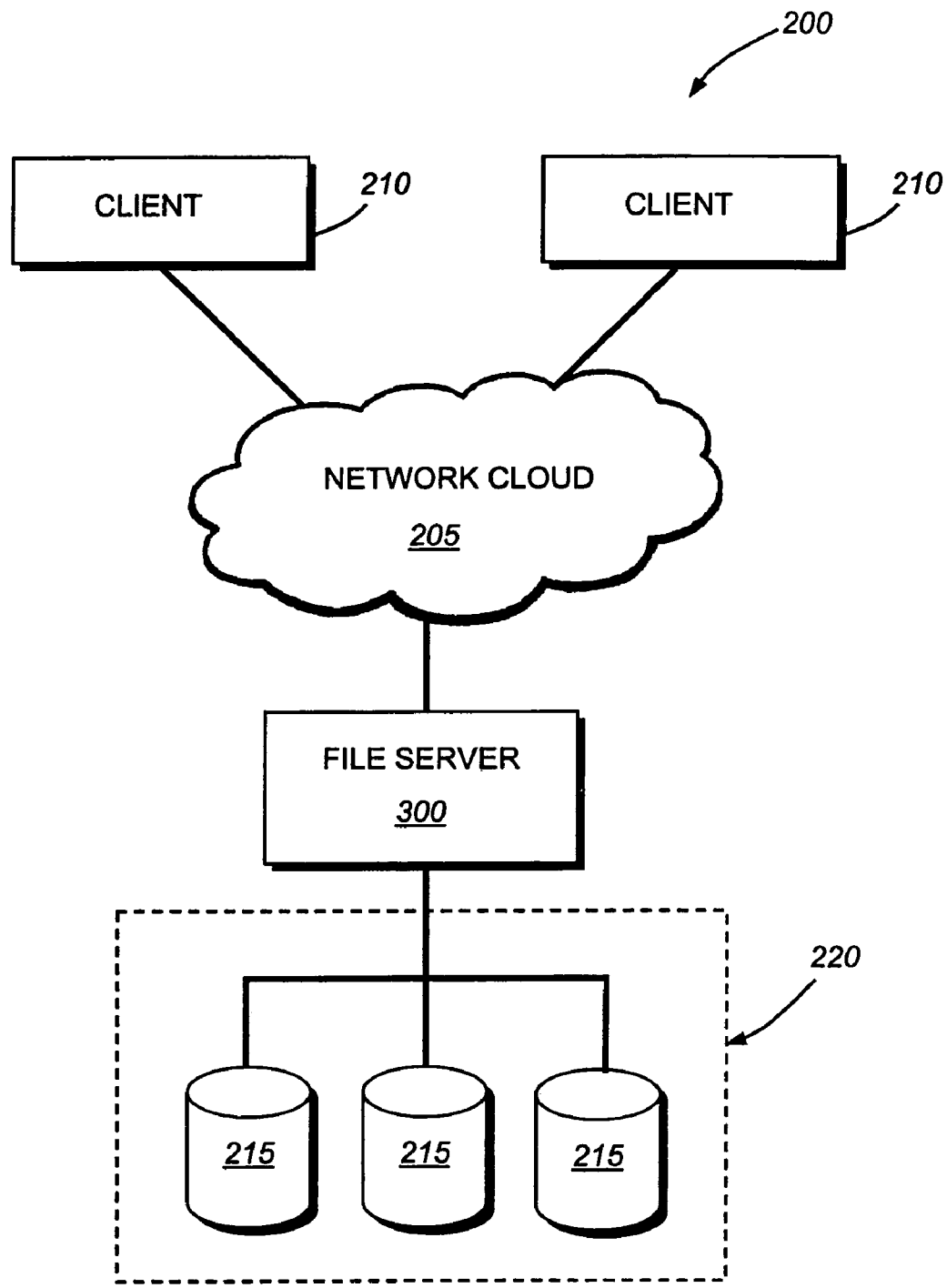
FIG. 2 is a schematic block diagram of an exemplary network environment including a file server.

FIG. 2 is a schematic block diagram of an exemplary network environment 200 in which the principles of the present invention are implemented. The environment 200 is based around a network cloud 205. This network cloud can be a local or network (LAN), a wide area network (WAN), virtual private network (VPN) utilizing communication links over the internet, for example, or a combination of LAN, WAN and VPN implementations can be established. For the purposes of this description, the term network cloud should taken broadly to include any acceptable network architecture. The network cloud 205 interconnects various clients 210. Also attached to the network cloud is a file server 300. This file server, described further below, is configured to control storage of, and access to, data and a set 220 of interconnected storage volumes 215. Each of the devices attached to the network cloud include an appropriate conventional network interface arrangement (not shown) for communicating over the network cloud using desired communication protocols such as the well-known Transport Control Protocol/Internet Protocol (TCP/IP), User Datagram Protocol ( UDP), Hyper Text Transport Protocol (HTTP), Simple Network Management Protocol (SNMP), or Virtual Interface Connections (VI).

B. File Servers

Figure 3:
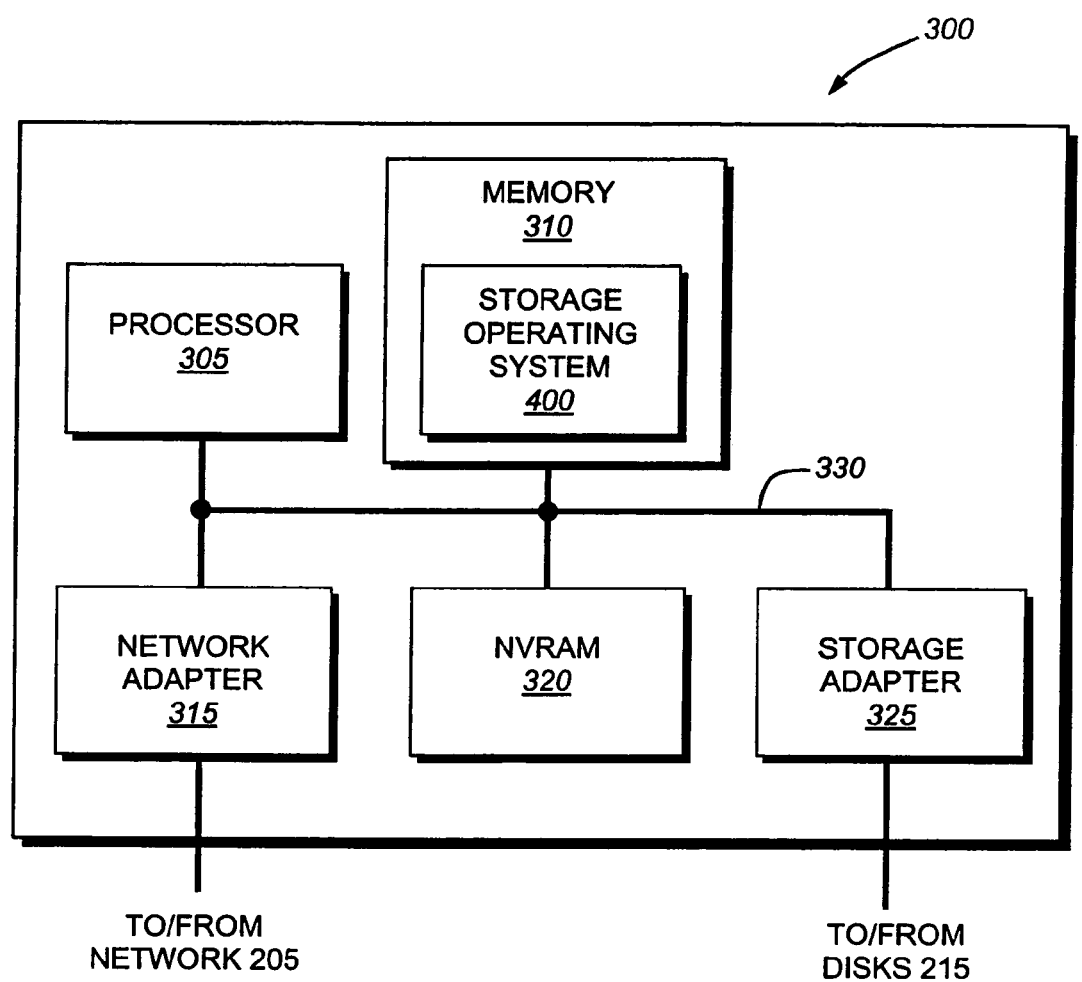
FIG. 3 is a schematic block diagram of an exemplary file server of FIG. 2.
Figure 4:
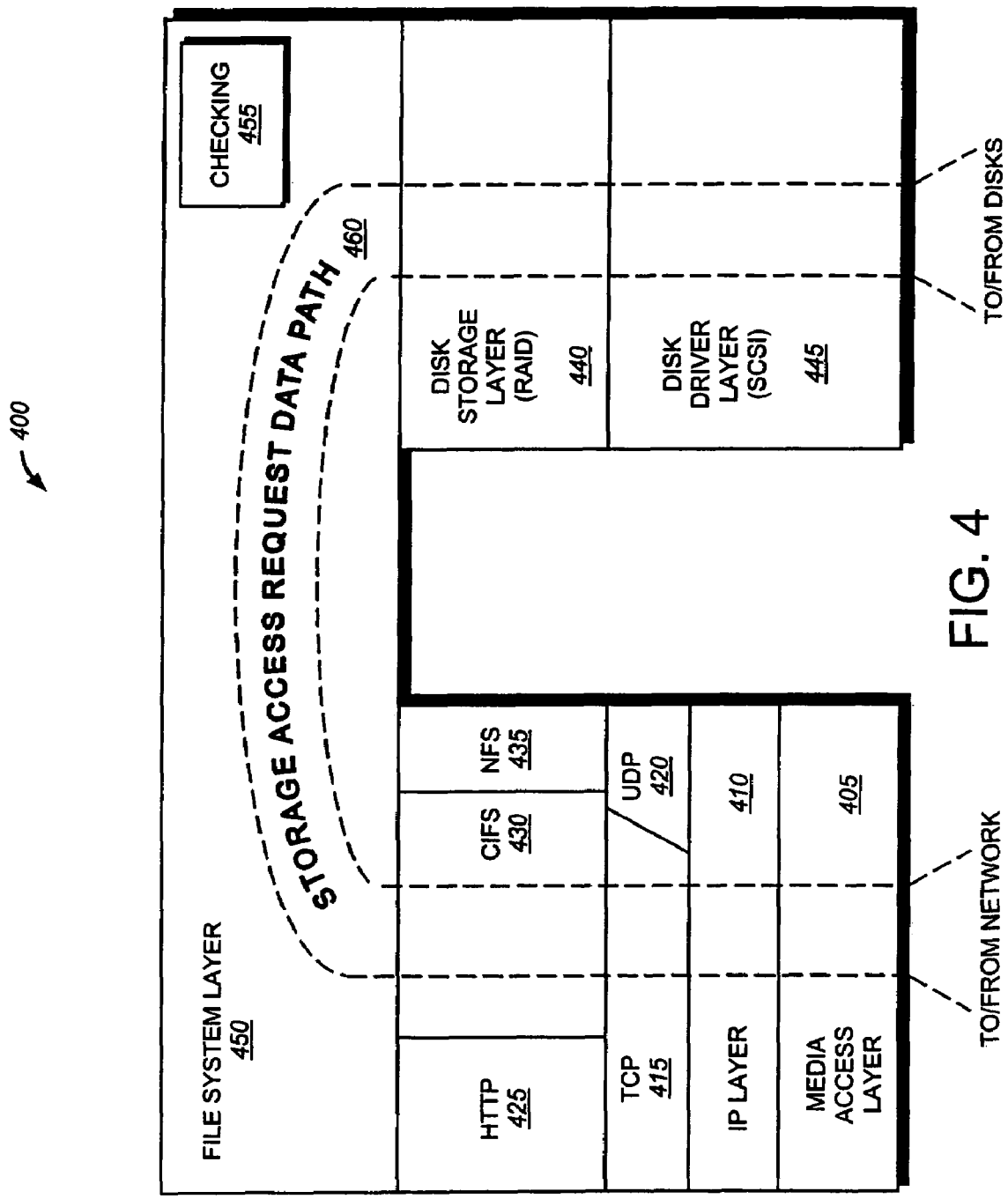
FIG. 4 is a schematic block diagram of an exemplary storage operating system for use with the file server of FIG. 3.

FIG. 3 is a more-detailed schematic block diagram of an exemplary file server 300. By way of background, a file server or filer, is a computer that provides file service relating to the organization of information on storage devices, such as disks. However, it will be understood by those skilled in the art that the inventive concepts described here any may apply to any type of file server, wherever implemented as a special-purpose or general-purpose computer, including a standalone computer.

The file server 300 comprises a processor 305, a memory 310, a network adapter 315, a nonvolatile random access memory (NVRAM) 320 and a storage adapter 325 interconnected by system bus 330. Contained within the memory 310 is a storage operating system 400 that implements a file system to logically organize the information as a hierarchical structure of directories and files on the disks. In the illustrative embodiment, the memory 310 comprises storage locations that are addressable by the processor and adapters for storing software program code. The operating system 400, portions of which are typically resident in memory and executed by the processing elements, functionally organizes the filer by inter alia, invoking storage operations in support of a file service implemented by the file server.

The network adapter 315 comprises a mechanical, electrical and signaling circuitry needed to connect the file server 300 to client 210 over network cloud 205. The client 210 maybe a general-purpose computer configured to execute applications, such as data base applications. Moreover, the client 210 may interact with the filer server 500 in accordance with the client/server model of information delivery. That is, the client may request the services of the file server, and the file server may return the results of the services requested by the client, by exchanging packets defined by an appropriate networking protocol.

The storage adapter 325 incorporates with the storage operating system 400 executing on the file server to access information requested by the client. Information maybe stored on the volumes 215 (FIG. 2) that is attached via the storage adapter 325 to the file server. The storage adapter 325 includes input/output (I/O) interface circuitry that couples to the disks over in I/O interconnect arrangement, such as a Fibre Channel serial link topology. The information is retrieved by the storage adapter and, if necessary, processed by the processor 305 (or the adapter 325 itself) prior to be forwarded over the system bus 330 to the network adapter 315, where information is formatted into appropriate packets and returned to the client 210.

In one exemplary file server implementation, the file server can include a nonvolatile random access memory (NVRAM) 320 that provides fault-tolerant backup of data, enabling the integrity of filer server transactions to survive a service interruption based upon a power failure, or other fault.

C. Storage Operating System

To facilitate the generalized access to the volumes 215, the storage operating system 400 implements a write-anywhere file system that logically organizes the information as a hierarchical structure of directories and files on the disks. Each "on-disk" file may be implemented as a set of disks blocks configured to store information, such as data, where as the directory may be implemented as a specially formatted file which other files and directories are stored. As noted above, in the illustrative embodiment described herein, the operating system is the NetApp® Data ONTAP™ operating system available from Network Appliance, Inc., that implements the write-anywhere file layout (WAFL™) file system. It is expressly contemplated that any appropriate file system can be used, and as such, where the term WAFL or file system is employed, it should be taken broadly to refer to any file system that is otherwise adaptable to the teachings of this invention.

The storage operating system comprises a series of software layers, including a media access layer 405 of network drivers (e.g., an Ethernet driver). The storage operating system 400 further includes network protocol layers, such as the Transport Control Protocol (TCP) layer 415 and the User Datagram Protocol (UDP) layer 420 and a supporting Internet Protocol (IP) layer 410.

A file system protocol layer provides multi-protocol data access and, to that end, includes support for the Network File System (NFS) protocol 435, the Common Internet File System (CIFS) protocol 430 and the Hyper Text Transfer Protocol (HTTP) 425. In addition, the storage operating system 400 includes a disk storage layer 440 that implements a disk storage protocol, such as a RAID protocol, and a disk driver layer 445 that implements a disk access protocol such as, e.g., a Small Computer System Interface (SCSI) protocol.

Bridging the disk software layers with the network and file system protocol layers is a file system layer 450 of the storage operating system 400. Generally the file system layer 450 implements a file system having an on-disk format representation that is block-based using, e.g., 4-kilobyte (KB) data blocks and using inodes to describe the files. In response to transaction requests, the file system generates operations to load (retrieve) the requested data from volumes 215 if it is not resident "in-core," i.e., in the filer's memory 310. If the information is not in memory, the file system layer 450 indexes into the inode file using the inode number to access an appropriate entry and retrieve a logical volume block number. The file system layer 450 then passes the logical volume block number to the disk storage (RAID) layer, which maps that logical number to a disk block number and sends the latter to an appropriate driver (for example, an encapsulation of SCSI implemented on a fibre channel disk interconnection) of the disk driver layer. The disk driver accesses the disk block number from volumes 215 and loads the requested data in memory 310 for processing by the filer 300. Upon completion of the request, the filer (and storage operating system) returns a reply, e.g., a conventional acknowledgement packet defined by the CIFS specification, to the client 210 over the network 205.

It should be noted that the storage access request data path 460 through storage operating system layers described above needed to perform data storage access for the client requests may alternately be implemented in hardware, software or a combination of hardware and software. That is, in an alternative embodiment of this invention, the storage access request data path 460 may be implemented as logic circuitry embodied within a field programmable gate array (FPGA) or in an application specific integrated circuit (ASIC). This type of hardware implementation increases the performance of the file service provided by the file server 300 in response to a file system request issued by a client.

D. File System Checking

Figure 5:
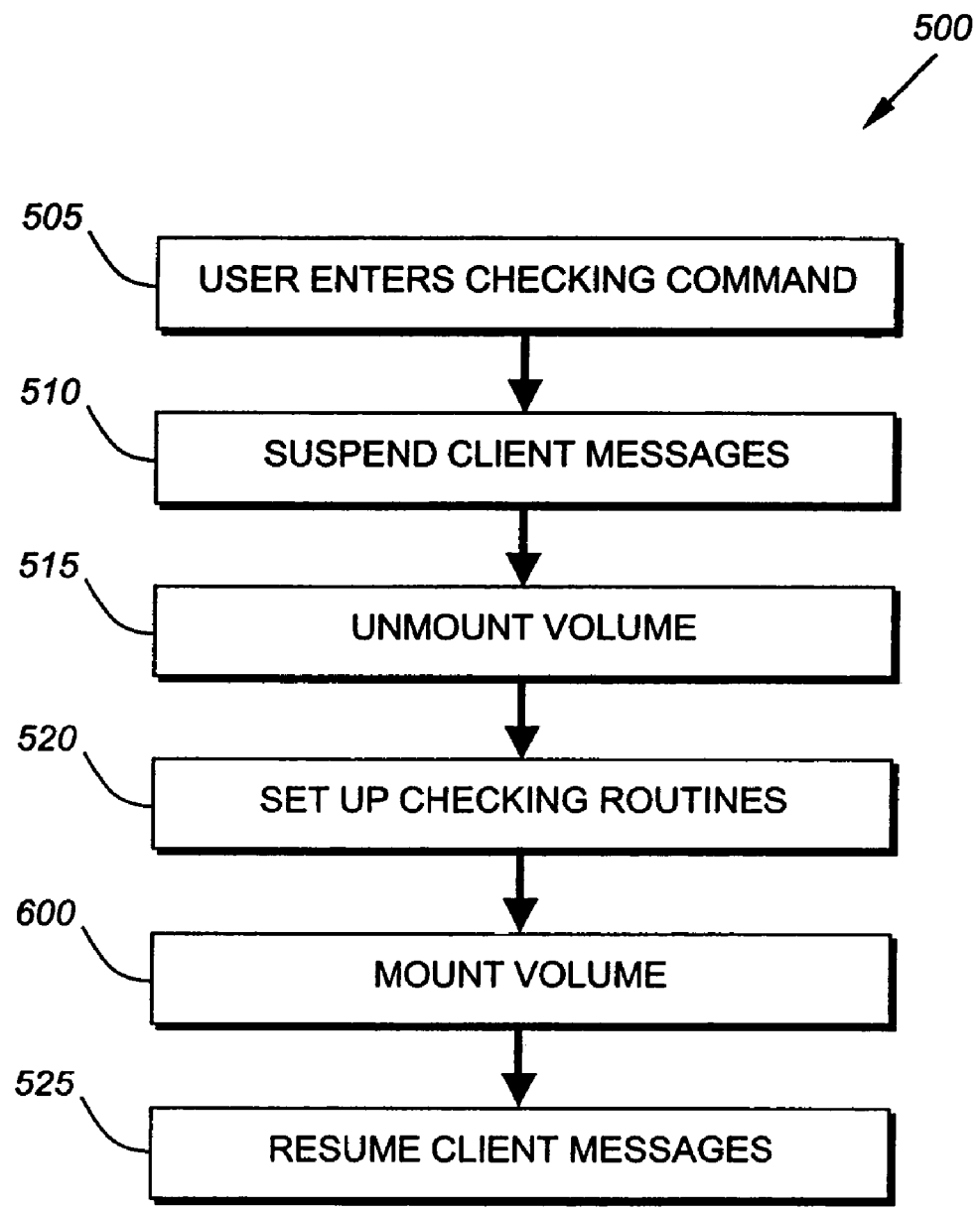
FIG. 5 is a flow chart detailing the procedure performed in initiating the checking of a file system.

The file system checking processes 455 within the file system layer 450 of the storage operating system permits on-line file system checking. The initialization procedure 500 of the illustrative on-line file system checking process is shown in FIG. 5. In step 505, the user enters a file system check command. This command can be entered to the file server via a command line interface (CLI) or via a graphical user interface (GUI) or via any other input methodology. In alternate embodiments, the storage operating system can be configured so that the file system check will automatically initiate upon a set event, for example, a crash or other error condition. Upon an entry of the check command, the file system layer suspends client messages in step 510. This suspension of client messages means that a file system layer will accept file system commands, including, for example, data write and/or read commands. However, while the client messages are suspended, the file system will not act upon the file system command. To the process or client initiating the file system command, it appears that there is a delay in the execution of a file system command. Next, in step 515, the volume to be checked is unmounted. In the illustrative embodiment of the Data ONTAP storage operating system, the unmounting of a volume causes any in-core caches to be flushed to the volume. This results in the physical disks comprising the volume to be in a consistent state. And next, in step 520, the checking routines are initialized. In the illustrative embodiment, the file system layer includes a command that retrieves an inode for further processing. To perform the on-line checking, the checking processes modifies this LoadInode( ) command to include a check of the file system structure, e.g., inode or directory, being accessed. The checking routines first perform the check of the inode to be retrieved before returning the inode to the process that called LoadInode( ). Next, the volume is remounted as described in procedure 600. Once the volume is remounted, the file system layer resumes client messages in step 525. After the resumption of client messages, client messages which have either been suspended or which are later received by the file system layer will be processed using the modified LoadInode ( ) function. Thus, any request for an inode will first check that inode and associated buffer trees before returning the inode to the calling process.

Figure 6:
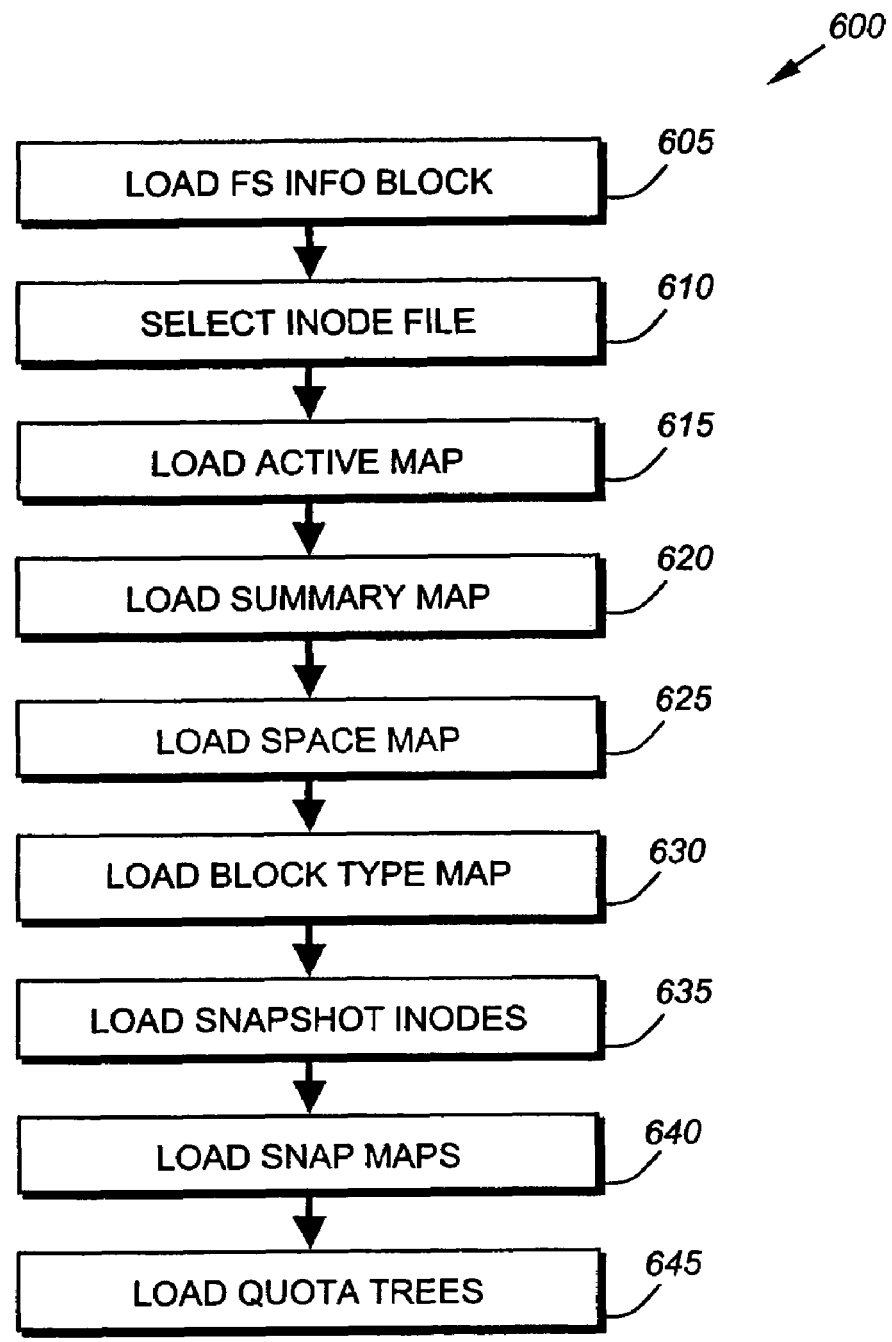
FIG. 6 is a flow chart of the steps of a procedure for mounting a volume in accordance with an embodiment of this invention.

The procedure 600 performed by the file system layer in mounting a volume is shown in FIG. 6. The file system information block is first loaded in step 605. The file system information block, as described above, contains numerous metadata relating to the file system. Next, in step 610, an inode file is selected. Typically, the inode file associated with the file system information block would be selected. However, in certain configurations, alternate inode files would be loaded. Then, in step 615, the active map is loaded. The active map is a data structure that is utilized by the file system to track which blocks are used by the active file system. It should be noted that during this and other subsequent load operations, the modified LoadInode ( ) command is utilized. Thus, during the mounting of the volume by the file system, the various inodes and directories associated with the file system files, is verified. Next, in step 620, the summary map is loaded. The summary map stores metadata associated with determining which blocks are used by any snapshots stored by the file system. "Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other identifier that distinguishes it from other PCPIs taken at other points in time. A PCPI can also include other information (metadata) about the active file system at the particular point in time for which the image is taken, including, for example, a current copy of the file system information block 105, as described above. The terms "PCPI" and "snapshot" shall be used interchangeably through out this patent without derogation of Network Appliance's trademark rights.

In step 625, the space map is loaded. The space map is a map of the various blocks of the file system noting which are utilized by the active file system and which are free to be allocated. Next, in step 630, the block type map is loaded. The block type map identifies what a block is used for. For example, a block could be utilized as a data holding block, or as a directory block. Next, the snapshot inodes are loaded in step 635. After the loading of the snapshot inodes the snap maps are loaded in step 640. In step 645, the quota trees are loaded. A quota tree (or qtree) is a subset of a volume that is defined by a directory. In the context of quotas, the maximum amount of storage resources available to a qtree can be specified. Thus, if it is desired to limit storage for a project having many users, it would be appropriate to specify a quota on a qtree instead of an actual security object. Multiple qtrees can be created on a single volume, with each qtree having a different size (as desired). However, the qtree can also be created without a limit (quota). A qtree is essentially a mini-volume with the property that every object within the qtree has a qtree ID in its inode. This information is scanned and identified by the file system. This facilitates identification of the applicable qtree for, e.g., a file on a volume.

As each of these file system metadata files is loaded using the modified LoadInode( ) function, each is checked in accordance with the teachings of this invention. Thus, by the completion of a volume mount operation, all required file system metadata files have been checked. Note that some files, such as the inode file, which contain a large quantity of data may be only selectively checked so as to reduce processing time and overhead.

Figure 7:
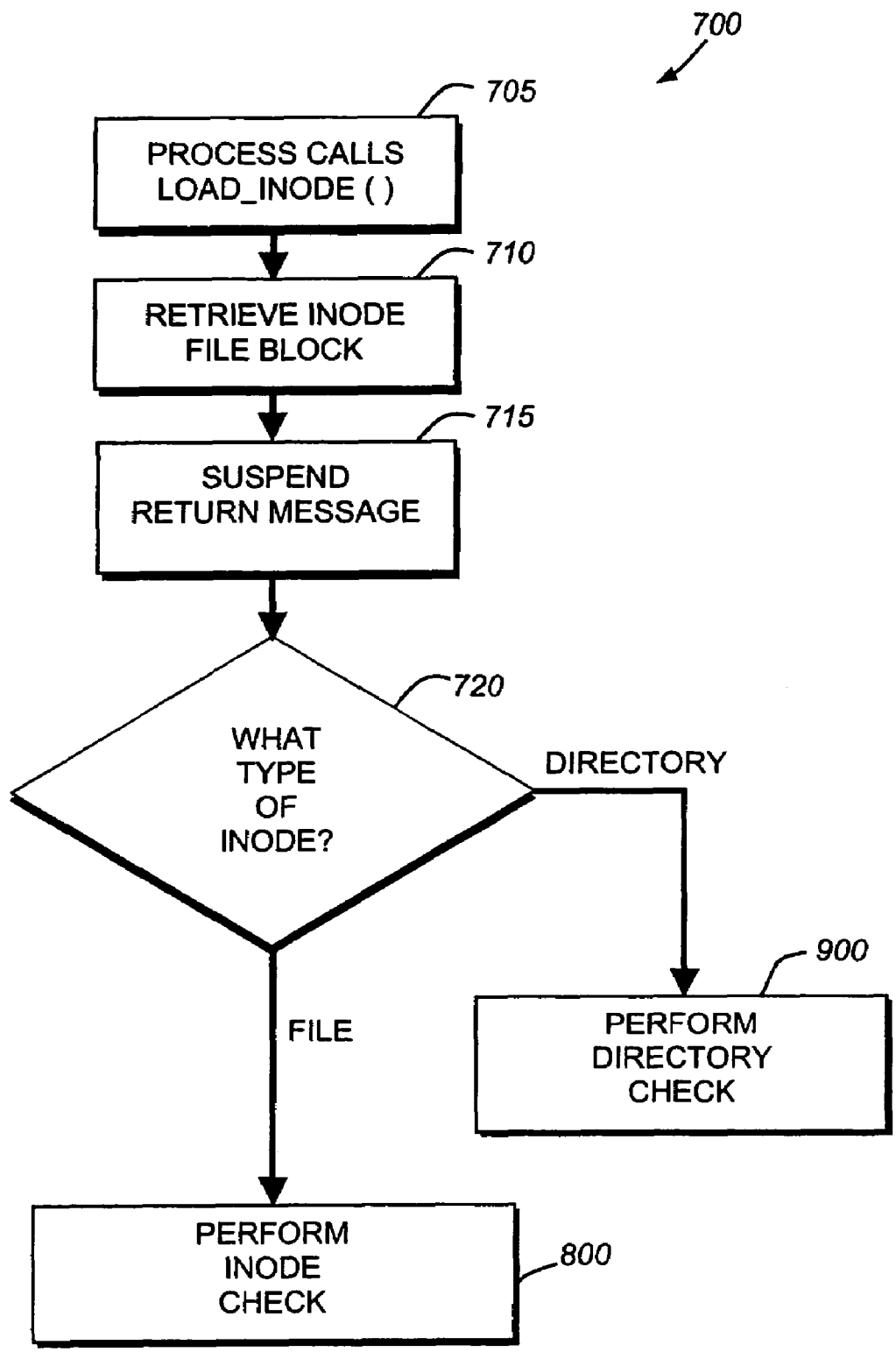
FIG. 7 is a flow chart detailing the steps of procedure of performing on-line checking in accordance with an embodiment of this invention.

The procedure 700 performed by the verification processes in performing an online check in a file system is shown in FIG. 7. In step 705, a process within the storage operating system calls the LoadInode ( ) function. As the LoadInode ( ) function has been modified, the traditional LoadInode ( ) functionality has been supplemented by the procedure described herein. The inode file block which was requested with the LoadInode ( ) command is retrieved (step 710). The inode file block could be in-core if it has been recently utilized, or may be physically located on disk. If the inode file block is on disk, then the file system layer will retrieve the data block from disk by sending the appropriate commands to the RAID and disk driver layers of the storage operating system. Next, in step 715, the return message to the process that called the LoadInode ( ) function is suspended. This suspension of the return message lasts for the duration of the check of this particular inode. Thus, to the process calling the LoadInode ( ) command, it appears that a request has some latency to it. This enables the on-line checking of the file system with minimal disruption of service. Requests for inodes will be delayed while the inodes are checked, but the file system, as a whole, remains on-line and available for use. By "on-line" it is meant that the file system is accessible by users for read and/or write functions.

In step 720, the file system checking routine determines what type of inode has been requested. If the inode requested is a file inode, then the checking routine performs an inode check as described in procedure 800. However, if the inode requested is a directory inode, then the checking routine will perform a directory check as described in procedure 900.

Figure 8:
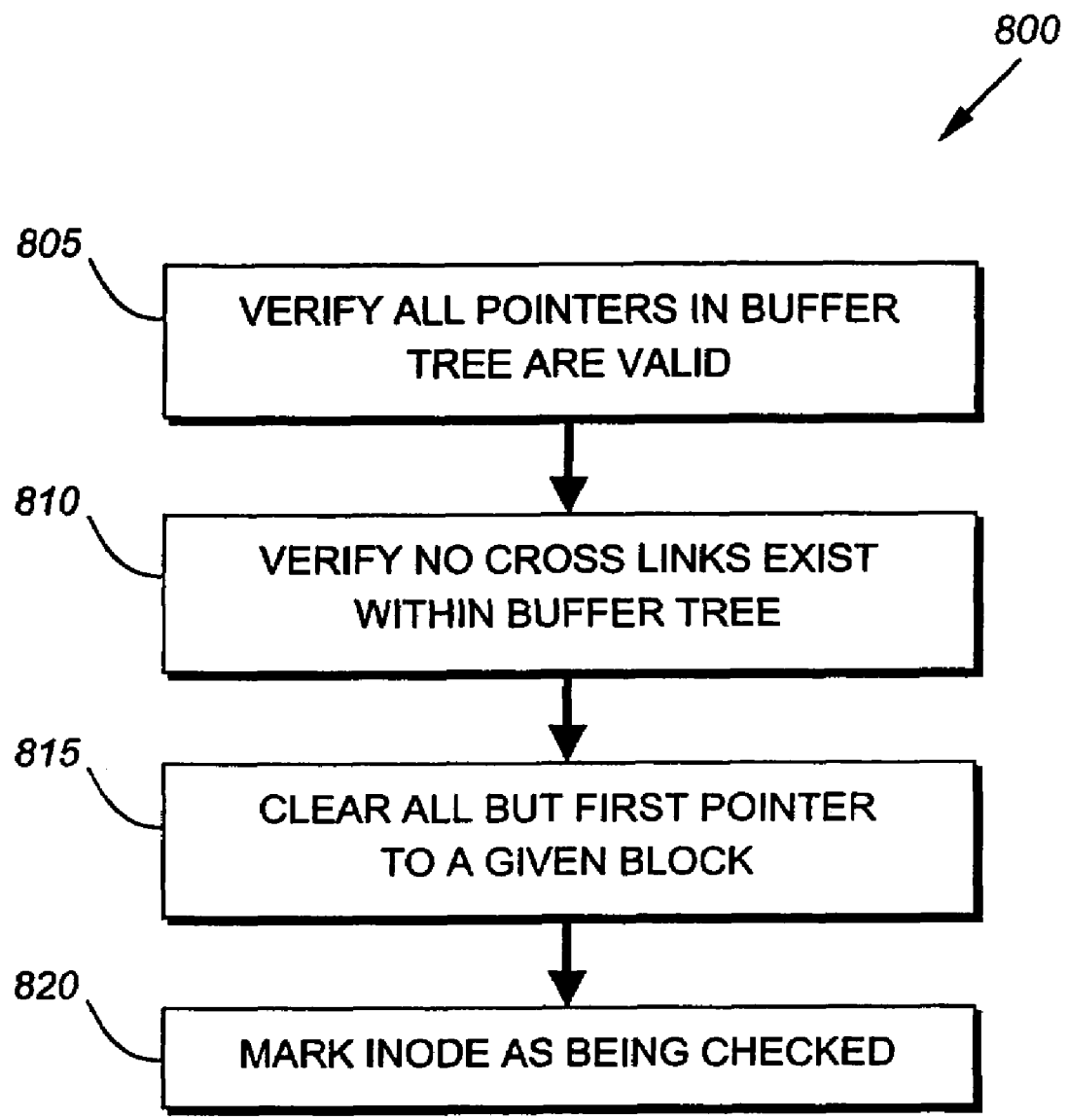
FIG. 8 is a flow chart detailing the steps of a procedure to perform on-line checking of an inode in accordance with an embodiment of this invention.

To check a file inode, the buffer trees associated with the inode are verified in accordance with procedure 800 shown in FIG. 8. This procedure works by traversing the various branches of the buffer tree and verifying certain key items. First, in step 805, the inode check verifies that all pointers in the buffer tree are valid. If a pointer is directed to an invalid block, the pointer is cleared.

Next, in step 810, the inode checking process verifies that no cross-links exist within a buffer tree. If a block has multiple pointers to it, the inode checking routine clears all but the first pointer (step 815). Thus, the first block to point to a given block is retained with any other blocks having their pointers removed.

Finally, the inode is marked as being checked (step 820). This marking can be accomplished by modifying a tracking file, described further below, or by modifying a bit within the inode's metadata.

Figure 9:
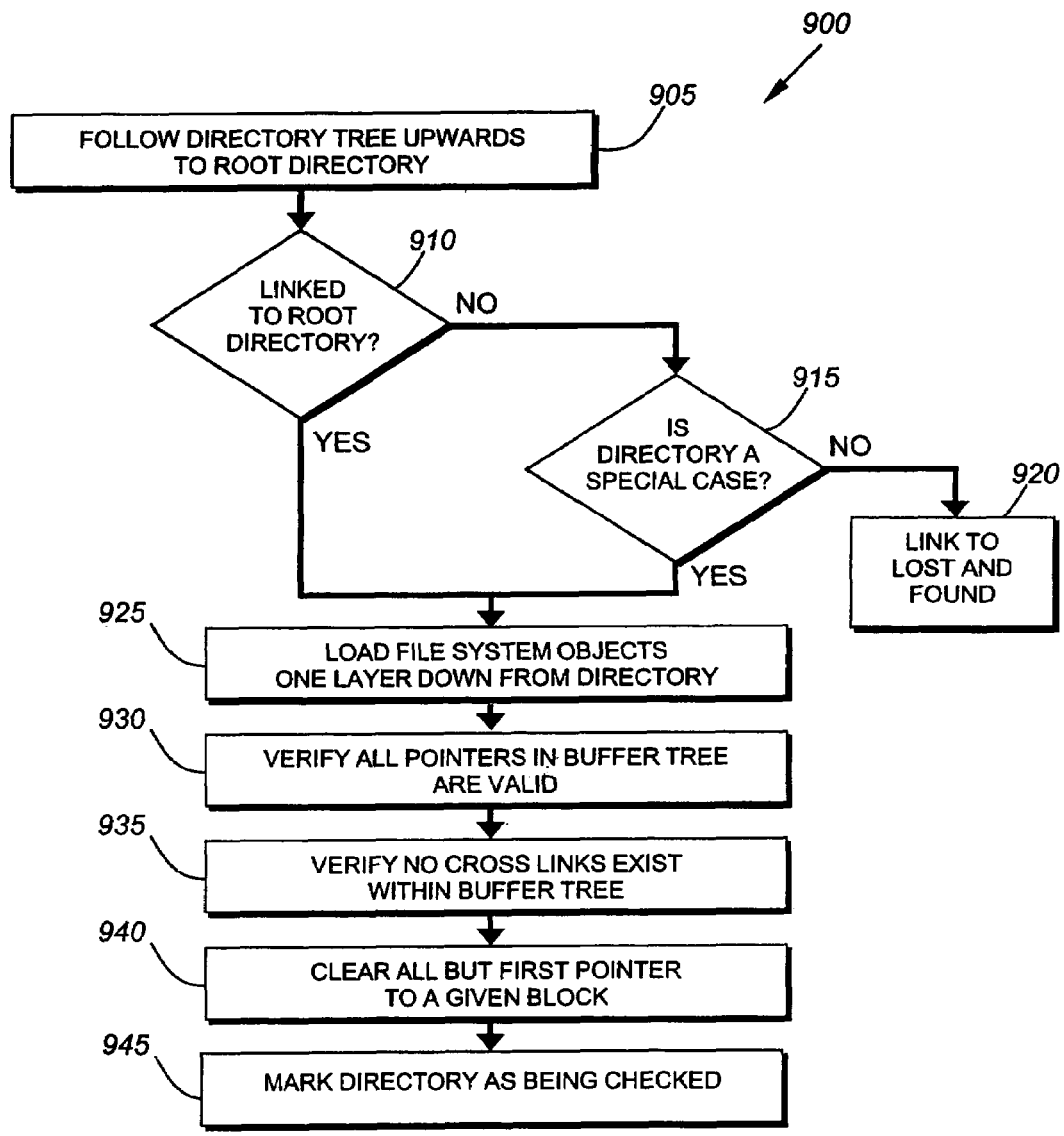
FIG. 9 is a flow chart detailing the steps of a procedure to perform on-line checking of a directory in accordance with an embodiment of this invention.

The procedure 900 performed by the verification process in checking a directory is shown in FIG. 9. The checking process follows the directory tree upwards to the root directory. For example, if the sub directory of the path "/dir1/dir2/sub" were being checked, the checking process would first move to the dir2 directory and then to the dir1 directory before finding the root directory. Traversal of the directory tree can be accomplished by, for example, accessing a special entry in a directory that identifies the directory's parent directory. In one embodiment, this special entry is denoted ".." (dot-dot) within a directory.

After the directory tree has been traversed upwards as far as possible, the process determines if the directory it linked to the root directory of the volume (step 910). If the directory is not linked to the root directory, the process determines if the directory is a special directory that should not be linked to the root directory in step 915. An example of such a special directory would be a metadirectory storing file system metadata. Metadirectories are further described in U.S. patent application Ser. No. 10/191,705 entitled METADATA DIRECTORY FILE SYSTEM, by Douglas Santry et al. If the directory is not a special case, then the directory is linked to a lost and found directory (step 920) for later processing. The lost and found directory can be accessed by a user or administrator of the filer to determine what further actions should be taken with respect to these directories.

If the directory does link to the root directory or if the directory is a special case that does not need to link to the root directory, the checking process then loads the file system objects that are one level beneath the directory (step 925). These file system objects would include, for example, subdirectories of the selected directory or files stored in the selected directory.

Next, the checking process performs the above-described buffer tree checks of the buffer trees associated with the directory. In step 930, the process verifies that all pointers within the buffer tree are valid. If there are invalid pointers, i.e. a pointer points to an invalid inode or file data block, the pointer is cleared. Next, in step 935, the process checks that no cross links exist within the buffer tree. If multiple blocks point to a given block, the rules stipulate that all but the first pointer is removed in step 940. Finally, in step 945, the directory is marked has having been checked. This marking can be accomplished by the use of a tracking file, described further below.

Figure 10:
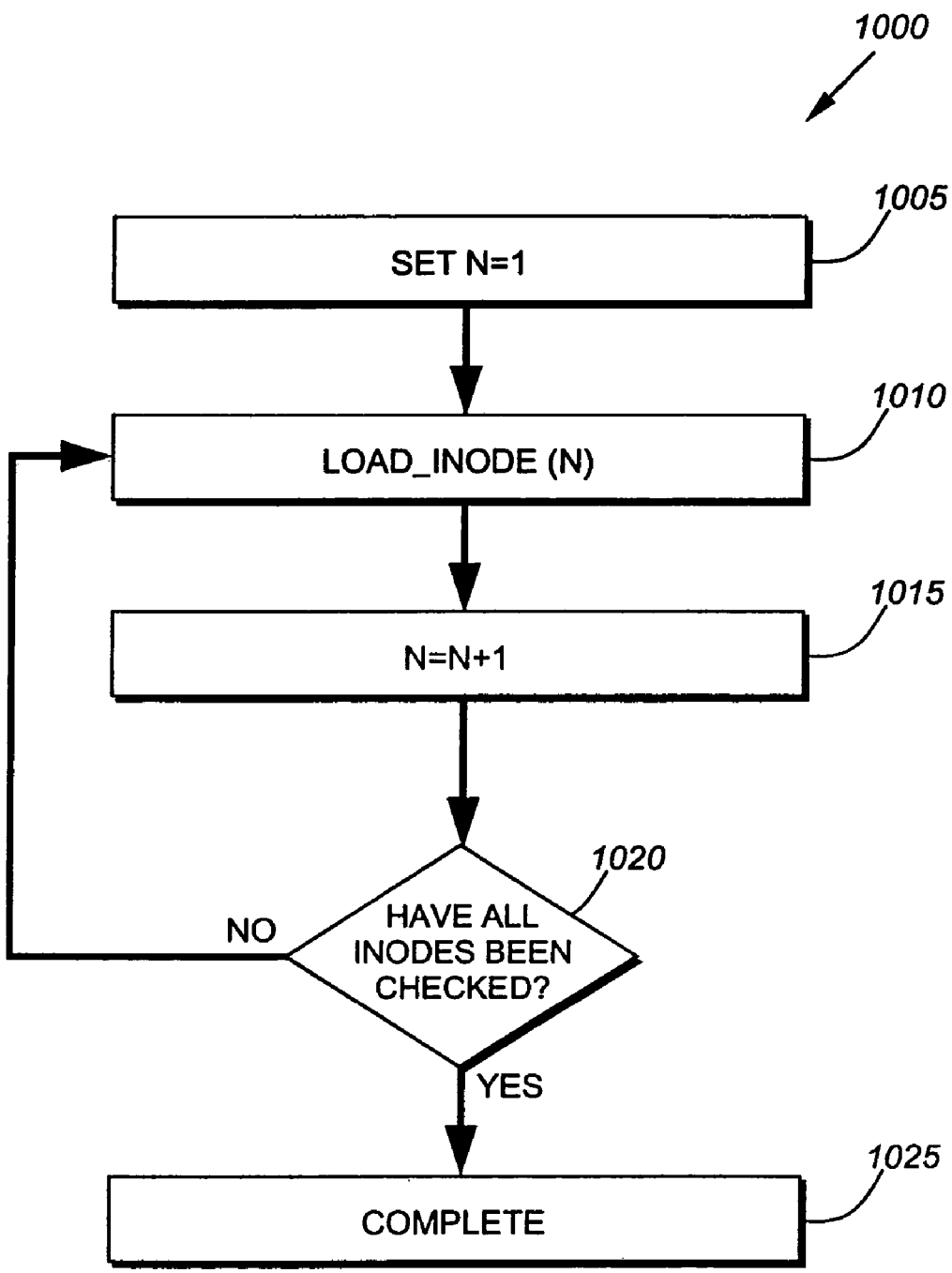
FIG. 10 is a flow chart of the steps performed by procedure in insuring that all inodes of a file system are checked.

To ensure that all inodes of a file system are checked in a timely manner, a background process (not shown) is initiated by the file system checking process. By "background process" it is meant generally a process executing at a low priority within the storage operating system that performs a given function with no user input. The procedure performed by this background process is shown in FIG. 10. A counter (N) is initially set to a value of one (step 1005). The background process then calls the LoadInode( ) function requesting the Nth inode, i.e. LoadInode(N). As the LoadInode( ) function has been modified to incorporate checking, the requested inode will be checked. Next, the counter is increased by one (step 1015). The background process determines if all inodes in the file system have been checked in step 1020. This check can be accomplished by utilizing the file system tracking files, described below. If all inodes have been checked, the process completes (step 1025) and exits. Otherwise, the process loops back to function step 1010. Thus, this background process serially requests inodes using the LoadInode( ) function, which causes the inodes and associated buffer trees to be checked.

In the illustrative embodiment, the file system checking procedure creates a file within the file system being checked. This file stores information relating to which inodes, buffer trees and directories have been checked by the file system process. By storing the status within a file on the active file system, memory is saved. In known examples of file system checking programs, the status information relating to the progress of the file system check is stored in the memory of the computer executing the file system check. When the file system is large and includes a substantial number of inodes and directories, the memory requirement to store the progress information may also be large. Thus, by storing the information on files in the file system, computer memory resources can be preserved.

To again summarize, after a user or administrator initiates a file system check, the volume containing the file system to be checked is unmounted. In the illustrative embodiment of a WAFL-based file system, this unmounting of the volume forces any caches to be flushed to disk resulting in a coherent file system on the disk. The LoadInode ( ) and load buffer commands, which are components of the file system layer of the storage operating system, are modified to include the novel file system checking routines described herein. Once these commands have been modified, the volume is remounted. This mounting procedure entails the loading of numerous metadata files from the file system by the computer. Each of these loading operations utilize the modified LoadInode ( ) and load buffer functions. Thus, the inodes buffer trees comprising the metadata files describing the file system are checked.

As processes and applications executing on the computer call the LoadInode ( ) command to retrieve an inode, the modified LoadInode ( ) command suspends the return message to the calling process while a check is performed of the requested inode. If the inode is part of a directory, a directory check is performed. The directory tree is traversed upwards to the root directory. If the directory does not link to the root directory, a determination is made if the directory is a special directory that does not need to link to the root. If the directory does not link to the root directory and is not a special case, the directory is linked to lost and found file for later processing. Otherwise, the file system objects, including files and directories, which are one layer down from the selected directory are loaded. By loading them using the modified LoadInode ( ) command, a check is performed on each of these file system elements. The buffer trees associated with the directory are then checked to ensure that no cross-links or multiple pointers exist.

If the inode requested by the LoadInode ( ) command is a regular file inode, then a regular inode check is performed. This inode check entails verifying all pointers of the buffer trees linked to the inode are valid and that no cross-links exist with the associated buffer trees. If multiple pointers exist to a given block, all but the first pointer are cleared. The inode is then marked as being checked.

In an illustrative embodiment, a background process sequentially loads inodes of the file system to ensure that all inodes will be checked in an expeditious manner, even if no user process or application requests the data therein.

The foregoing has been a detailed description of an illustrative embodiment of the invention. Various modifications and additions can be made without departing from the spirit and scope of the invention. Additionally, while this description has been written in reference to filers and file servers, the principles are equally pertinent to all types of computers, including stand alone computers. Further, it is expressly contemplated that the teachings of this invention can be implemented as software, including a computer readable medium having program instructions executing on a computer, hardware, firmware, or a combination thereof. Accordingly this description is meant to be taken only by way of example and not to otherwise limit the scope of the invention.

What is claimed is:

1. A method for checking a file system, comprising:
    sending a request from at least one external client, to retrieve an object from a file system contained on a file server, the object located within an inode on the file system;
    accessing a file system structure on the file system by making a function call, the function call including a command that retrieves the inode containing the requested object;
    modifying the command to include a check of the inode and any associated buffer trees;
    performing an on-line checking of the inode and the associated buffer trees for coherency while the inode is being retrieved by the file system, performing the inode check by,
    verifying that all pointers point to valid file system structures;
    clearing any pointers that are directed to an invalid file system structure;
    verifying that no file system structure has multiple pointers;
    clearing all but the first pointer to a file system structure that has multiple pointers; and
    marking the file system structure as checked; and
    repairing any non-coherent portions of the file system located during checking.

2. The method of claim 1, wherein the file system structure is a data block, a directory, or a buffer tree.

3. A method of claim 1, further comprising:
    executing a background process; and
    repeating the background process until all file system structures have been checked.

4. The method of claim 3 wherein the background process further comprises:
    sending function calls to file system structures; and
    receiving responses to the function calls after the file systems structures have been checked.

5. The method of claim 4 wherein the function call is a load function.

6. The method of claim 3 wherein the file system structure is a data block, a directory, or a buffer tree.

7. The method of claim 3, wherein the step of checking is performed in response to the background process.

8. The method of claim 1, further comprising:
    receiving a function call to a file system structure; and
    responding to the function call.

9. The method of claim 8 wherein the function call is a load function.

10. A computer, comprising:
    a file system having one or more file system structures; and
    a processor configured to,
    receive a request from at least one external client, to retrieve an object from a file system contained on a file server, the object located within an inode on the file system,
    access a file system structure on the file system by making a function call, the function call including a command that retrieves the inode containing the requested object,
    modify the command to include a check of the inode and any associated buffer trees,
    perform an on-line check of the inode and the associated buffer trees for coherency while the inode is being retrieved by the file system, the on-line check further configured to,
    verify that all pointers point to valid file system structures,
    clear any pointers that are directed to an invalid file system structure,
    verify that no file system structure has multiple pointers,
    clear all but the first pointer to a file system structure that has multiple pointers, and
    mark the file system structure as checked; and
    repair any non-coherent portions of the file system located during the check.

11. The computer of claim 10, wherein the file system structure is a data block, a directory, or a buffer tree.

12. The computer of claim 10, wherein the processor is further configured to:
    execute a background process; and
    repeat the background process until all file system structures have been checked.

13. The computer of claim 12 wherein the file system structure is a data block, a directory, or a buffer tree.

14. The computer of claim 12, wherein during execution of the background process, the processor is further configured to:
    send function calls to file system structures; and
    receive responses to the function calls after the file systems structures have been checked.

15. The computer of claim 14 wherein the function call is a load function.

16. The computer of claim 12, wherein the processor performs the check in response to the background process.

17. The computer of claim 10, wherein the process is further configured to:
    receive a function call to a file system structure,
    respond to the function call.

18. The computer as in claim 17, further comprising:
    pointers to the file system structures, the processor configured to,
    verify that all pointers point to valid file system structures,
    clear any pointers that are directed to an invalid file system structure,
    verify that no file system structure has multiple pointers,
    clear all but the first pointer to a file system structure that has multiple pointers, and
    mark the file system structure as checked.

19. The computer of claim 17 wherein the function call is a load function.

20. A computer, comprising:
    processor executing a file system, the file system having one or more file system structures;
    pointers to the file system structures;
    means for sending a request from at least one external client, to retrieve an object from a file system contained on a file server, the object located within an inode on the file system,
    means for accessing a file system structure on the file system by making a function call, the function call including a command that retrieves the inode containing the requested object, means for modifying the command to include a check of the inode and any associated buffer trees, means for performing an on-line check of the inode and the associated buffer trees for coherency while the inode is being retrieved by the file system, the on-line check further configured to have, means for verifying that all pointers point to valid file system structures, means for clearing any pointers that are directed to an invalid file system structure, means for verifying that no file system structure has multiple pointers, means for clearing all but the first pointer to a file system structure that has multiple pointers, and means for marking the file system structure as checked;

means for repairing any non-coherent portions of the file system located during the check; and means for storing the repaired portions of the file system structure on the file server.

21. The computer of claim 20, further comprising:

means for executing a background process; and means for repeating the background process until all file system structures have been checked.

22. The computer of claim 21 wherein the background process further comprises:

means for sending function calls to file system structures; and means for receiving responses to the function calls after the file systems structures have been checked.

23. The computer of claim 21, wherein the means for checking is performed in response to the background process.

24. The computer of claim 20, further comprising:

means for receiving a function call to a file system structure; and means for responding to the function call.

25. The computer of claim 24, further comprising:

pointers to the file system structures;

means for verifying that all pointers point to valid file system structures;

means for clearing any pointers that are directed to an invalid file system structure;

means for verifying that no file system structure has multiple pointers;

means for clearing all but the first pointer to a file system structure that has multiple pointers; and means for marking the file system structure as checked.

26. A method for verifying a data block, comprising:

calling a function using a process on a file server to request a data block from the file system;

retrieving the requested inode block from the file system;

suspending the returning of the inode block to the process;

determining whether a data block or a directory block has been requested by the process; and in response to determining the block is a data block, performing a data block check while the data block is still accessible to a client by modifying a retrieval command to include a check of the inode and any related buffer trees, performing the inode check further comprising, verifying that all pointers point to valid file system structures;

clearing any pointers that are directed to an invalid file system structure;

verifying that no file system structure has multiple pointers;

clearing all but the first pointer to a file system structure that has multiple pointers; and marking the file system structure as checked.

27. A system comprising:

a file system having pointers to one or more file system structures; and a processor configured to, call a function using a process on a file server to request a data block from the file system, retrieve the requested inode block from the file system, suspend the returning of the inode block to the process, determine whether a data block or a directory block has been requested by the process, perform a data block check in response to determining the block is a coherent data block while the data block is still accessible to a client by modifying a retrieval command to include a check of the inode and any associated buffer trees, the check further configured to:

verify that all pointers point to valid file system structures;

clear any pointers that are directed to an invalid file system structure;

verify that no file system structure has multiple pointers;

clear all but the first pointer to a file system structure that has multiple pointers, and mark the file system structure as checked; and repair any non-coherent portions of the file system located during the check.

* * * * *

UNITED STATES PATENT AND TRADEMARK OFFICE
CERTIFICATE OF CORRECTION

PATENT NO. : 7,499,959 B2  Page 1 of 1
APPLICATION NO. : 11/024184
DATED : March 3, 2009
INVENTOR(S) : John K. Edwards It is certified that error appears in the above-identified patent and that said Letters Patent is hereby corrected as shown below:

In Col. 3, line 61 should read:
 directory check ~~is~~ of the selected inode. The directory check- In Col. 11, line 41, claim 3 should read:
 3. ~~A~~ The method of claim 1, further comprising:

In Col. 12, line 3, claim 10 should read:
 that retrieves the ~~mode~~ inode containing the requested object, Signed and Sealed this
Third Day of July, 2012

David J. Kappos
*Director of the United States Patent and Trademark Office*